United States Patent Office 2,945,995
Patented July 19, 1960

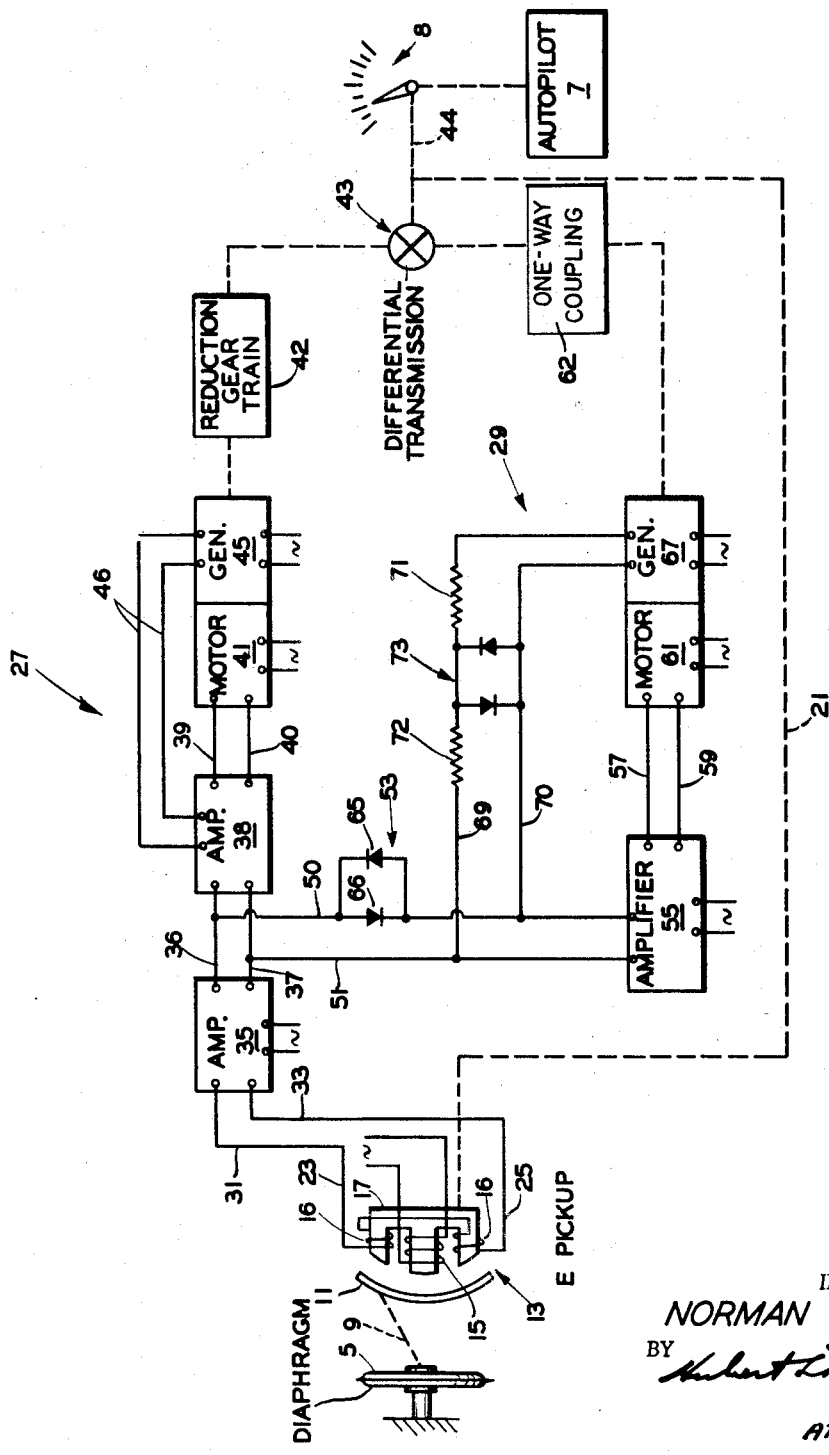

2,945,995

VARIABLE DAMPED, HIGH GAIN, LOW PHASE SHIFT TWO MOTOR SERVO SYSTEM

Norman Wail, Whitestone, N.Y., assignor to Bendix Aviation Corporation, Teterboro, N.J., a corporation of Delaware Filed Dec. 23, 1957, Ser. No. 704,403

2 Claims. (Cl. 318—19)

The invention relates to improvements in a two-motor servo system of a type such as disclosed and claimed in U.S. application Serial No. 689,612 filed October 11, 1957, by Richard W. Bluhm and Paul L. Reuter, and assigned to Bendix Aviation Corporation.

An object of the invention is to provide means whereby upon a sensed condition or position changing at a rate within a predetermined limited "dead band" a low speed servo motor is in a controlling relation while under other operating conditions in which said condition or position changes at a rate in excess of such predetermined "dead band" another or high speed servo motor acts in additive and controlling relation to more rapidly adjust the controlled member or device to a position with a minimum time lag.

Another object of the invention is to provide an improved two motor servo system in which there is included a novel threshold or limiting means arranged to cut in or render effective a high speed servo motor so as to act in additive and controlling relation upon a sensed condition or position changing at a rate in excess of a predetermined "dead band" together with other means arranged to render effective an anti-hunting generator so arranged as to rapidly slow down the high speed servo motor upon the change in the sensed condition decreasing into the predetermined "dead band," whereupon the low speed servo motor thereafter serves to wipe out any small error that may then exist within the predetermined "dead band."

Further, it is desirable in such a system that upon the sensed condition or position changing sinusoidally that the controlled device follow such changes with a minimum time lag. An object of the invention, therefore, is to accomplish the foregoing by the provision of novel threshold or limiting means by which the high speed servo motor is brought into operation and feedback voltage from an anti-hunting generator driven by the high speed servo motor and in excess of a predetermined value diverted from the control loop of the high speed motor so that the device controlled thereby may rapidly follow changes in the sensed condition or position with a minimum time lag, while upon the high speed servo motor being required to slow down as at the peak of the sine wave threshold or limiting means cuts the high speed servo motor out of operation, whereupon the feedback voltage from the anti-hunting generator becomes fully effective to slow the high speed servo motor down rapidly as required, thus allowing for low phase shift at high frequency. (The low speed servo motor serves to wipe out any small error that exists when the high speed servo motor is rendered ineffective under steady state conditions, while the high speed servo motor under transient changes in the sensed condition is rendered effective to run immediately to its maximum speed to follow the changing sensed condition as rapidly as the motor speed will allow with minimum lag, but as the controlled device approaches a position corresponding to that of the sensed condition, the threshold means renders the high speed servo motor ineffective to follow the sensed condition and the anti-hunting generator is rendered effective as a brake to stop the high speed servo motor.)

Another object of the invention is to provide a novel two motor servo control system which combines inherent accuracy and resolution with the expanded speed range afforded by a two motor servo control system.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:

The drawing is a schematic representation illustrating one embodiment of the invention as applied to a condition responsive system.

Referring to the drawing, there is indicated by a numeral 5 a diaphragm or bellows responsive to a condition or fluid pressure such as atmospheric pressure prevailing at the altitude of an aircraft and effective through the control mechanism shown diagrammatically in the drawing to control a desired device or devices, such as an automatic pilot 7 and altitude indicator arm 8 in response to the altitude condition of the aircraft.

The bellows 5 is operatively connected through a suitable linkage indicated by the numeral 9 to an armature or magnetic control vane 11 of an E-pickup device indicated generally by the numeral 13 and including the energizing winding 15 connected to a suitable source of alternating current and inductively coupled to the control winding 16 through the E-shaped core 17 and armature 11. The E-pickup device 13 is of a conventional type and is so arranged that the vane or armature 11 may be adjusted by the bellows 5 relative to the core 17 so as to control the phase and magnitude of the alternating current induced in the windings 16 depending upon whether the fluid pressure sensed by the bellows 5 has increased or decreased with regard to the value of the arm indicated pressure.

The core 17 is arranged to be adjusted relative to the vane or armature 11 through operation of a shaft 21 connected to the output shaft of the control mechanism leading to the automatic pilot 7 and indicator arm member 8 so that servo motor adjustment thereof may in effect return the core 17 to a null position relative to the armature 11 and wipe out the error signal induced in the windings 16 and applied across output lines 23 and 25 leading from the E-pickup 13.

Thus, a change in the fluid or atmospheric pressure applied to the diaphragm 5 will cause a change in the displacement of the E-pickup vane 11 and result in an output error voltage from the E-pickup. This error voltage is in turn applied across the input lines of a fine or low speed control loop 27 and a coarse or high speed control loop 29.

Referring to the fine control loop 27, the error voltage applied across the lines 23 and 25 is in turn applied to the input lines 31 and 33 of the loop 27 and in turn to a high gain electronic amplifier 35 of conventional type having output lines 36 and 37 leading to a second amplifier 38 and thereafter by output lines 39 and 40 to a control motor 41. The motor 41 may be of a conventional two-phase reversible type to adjust the automatic pilot 7 and indicator arm 8 through a reduction gear train 42, differential transmission 43 and shaft 44. The arrangement is such that the error voltage applied through the amplifiers 35 and 38 to the motor 41 causes the motor to turn shaft 44 in such a direction as to cause the altitude indicator arm 8 to follow the position or expansion and contraction of the bellows 5 and the E core 17 to be re-positioned through shaft 21 driven from shaft 44 so as to reduce the error voltage to zero.

As shown in the drawing, the motor 41 also drives a generator 45 of a conventional type arranged to apply to the amplifier 38 through lines 46 a counter electromotive force tending to prevent the motor 41 from overshooting or hunting as explained in the now expired Riggs U.S. Patent No. 2,115,086, granted April 26, 1938.

For a constant rate of change in the fluid pressure applied to the diaphragm 5, the position of the E-pickup vane 11 will change at a constant angular velocity resulting in a constant rotational speed of the motor 41. In a particular motor-generator combination, the motor 41 may run smoothly over a predetermined range of, for example, from 60–8,000 r.p.m. Now with the gear train 42 providing, for example, a 20:1 gear ratio or low speed drive between the motor 41 and the output shaft 44, the change of pressure may be smoothly followed over a rate range equivalent to an output shaft speed range of 3.0 to 400 r.p.m.

If the fluid pressure applied to the diaphragm 5 changes at a rate higher than the equivalent of the higher rate of say 400 r.p.m. at the output shaft 44, the E-pickup core 17 will lag behind the travel of the vane 11 in increasing amounts, since the top speed of the motor 41 under load will be equivalent to 400 r.p.m. at the output shaft 44, whereupon the coarse or high speed control loop 29 will be brought into operation, as hereinafter explained.

Referring now to the coarse or high speed control loop 29, the error voltage applied across the first stage high gain amplifier 35 output lines 36 and 37 is applied to the input lines 50 and 51 of the loop 29 and through a threshold limiter means or diode switch 53 to an electronic amplifier 55 of conventional type having output lines 57 and 59 leading to a high speed control motor 61. The motor 61 may be of a conventional two-phase reversible type driving connected through a one-way coupling 62, the differential transmission 43 and shaft 44 to the indicator arm 8 and other device or devices controlled thereby such as the automatic pilot 7. The one-way coupling 62 may, for example, be of a suitable type so arranged as to prevent rotation from the low speed servo motor 41 from "backing up" through the differential transmission 43 and rotating the motor 61 before the diode switch 53 has been actuated.

The threshold limiter means or diode switch 53 may be nonlinear resistors 65 and 66 made up, for example, of selenium or copper oxide discs connected back to back so as to pass alternating current. It will be understood, however, that the invention is not restricted to the use of non-linear resistors for the voltage limiter 53, but that any suitable type of non-linear circuit element adapted to limit the effective voltage to an applied voltage in excess of a predetermined value may be employed. Among the devices suitable for such a purpose are electron discharge devices, such as a glow tube, rectifier tubes in series with a bias voltage amplifier biased to cut off, saturable reactors, varistors and thermistors.

The arrangement is such that upon the fluid pressure applied to the diaphragm 5 changing at a rate in excess of the range of the fine control loop 27 and causing the E-pickup core 17 to lag behind the travel of the vane 11, the lagging condition of the E core 17 will cause the error voltage from the E-pickup 13 to increase until the input voltage applied across lines 50 and 51 from the high gain amplifier 35 becomes sufficiently high as to exceed the predetermined threshold limit value or "dead band" range of the threshold limiter or diode switch 53 whereupon the diode switch 53 at the input to the amplifier 55 actuates and causes the high speed servo motor 61 to start to rotate. The high speed servo motor 61 as in the case of the motor 41, also drives a generator 67 of a conventional type arranged to apply to the input of the amplifier 55 through lines 69 and 70 connected across the input thereof a counter electromotive force tending to prevent the motor 61 from overshooting or hunting.

Further, in the line 69 is a resistor 71 arranged to cooperate with a diode switch 73 of a type similar to the diode switch 53 and serving to shunt output voltage decreases and the output voltage from the generator 67 across the output lines 69 and 70 of the generator 67 so as to render such excessive output voltage ineffective to retard the rotation of the high speed servo motor 61. A resistor 72 is also provided in the line 69 to prevent shorting of the input signal voltage across the diode switch 73.

Upon the error signal voltage applied from the loop 27 decreasing to within the "dead band" range, i.e. to a value insufficient to pass the threshold limit means or diode switch 53, as upon the sensed condition changing at a rate within the predetermined limited range of the diode switch 53, the speed of the high speed motor 61 decreases and the output voltage from the generator 67 decreases to a value below that for which the other threshold limit means or diode switch 73 is set, whereupon output voltage from generator 67 is fully effective to rapidly slow the motor 61 down as required. Under the latter conditions, the output voltage from generator 67 is substantially unopposed by the main error signal voltage applied across lines 36 and 37.

It will be seen then that upon actuation of the diode switch 53, rotation of motor 61 is applied through the "one-way" mechanical coupling 62 to the differential transmission 43 and therein added to the rotation of the motor 41 applied to the differential transmission 43. Since there is no gear reduction between the motor 61 and the output shaft 44, the output shaft 44 can rotate at a maximum speed of, for example, 8,000 r.p.m. applied by the motor 61 plus 400 r.p.m. for the motor 41 or 8,400 r.p.m. The output shaft 44 will thus rotate smoothly from 3 to 8,400 r.p.m. or over a speed range of 2800/1. If, for example, the lowest required tracking rate of the servo were fifty feet per minute of pressure altitude, the maximum tracking rate would be 50×2800 or 140,000 feet per minute, as compared to about 7,000 feet per minute available from a single motor servo loop.

Moreover, the counter electromotive force applied by the generator 67 is effective only within the lower speed ranges of the motor 61, as predetermined by the setting of the threshold limit means or diode switch 73, and at greater speeds of the motor 61 the counter electromotive force of the generator 67 does not increase with additional speeds of the motor 61. However, upon the main control error signal decreasing below the preset limits of the diode switch 53 so as to discontinue the operation of the servo motor 61, the counter electromotive braking force of the generator 67 within the limits set by the diode switch 73, becomes fully effective to bring the servo motor 61 rapidly to a stop.

Referring to the drawing, it will be seen that if the condition or position sensor 11 is moved sinusoidally, the diode switch 53 becomes effective to bring into operation the high speed servo system 29 and the diode switch 73 serves to render ineffective the generator 67 to feed back voltage into the high speed servo 29 in excess of the threshold or limited value set by the diode switch 73 so that the controlled device 7 and 8 may follow the condition or position sensor 11 with a minimum time lag. When the high speed motor 61 is required to slow down say at the peak of the sine wave, the diode switch 53 becomes effective to momentarily discontinue the control of the high speed servo motor 61 from the output of the amplifier 35, while the setting of the diode switch 73 is sufficiently greater than that of the diode switch 53 that a feedback voltage is momentarily applied by the generator 67 to slow down the motor 61 rapidly as required so as to follow the sensor 11 at the peak of the sine wave with a minimum time lag.

The foregoing thus allows for a low phase shift at high frequency. (The low speed servo system 27 serves to wipe out any small error that exists when the high speed servo system 29 is rendered ineffective by the diode switch 53 under substantially steady state conditions.)

As for transient conditions, a large step change by the sensor 11 renders the resulting relatively high error signal effective to pass the diode switch 53 so as to cause the high speed motor 61 to run immediately to its maximum speed so that the controlled device 7 and 8 follows the large input step change as fast as the speed of the motor 61 will allow. As the position of the controlled device 7 and 8 approaches a position corresponding to that of the sensor 11, the resulting lower error signal is ineffective to pass the diode switch 53 and the resulting feedback voltage passed by the diode switch 73 is effective to provide an electromotive force acting as a brake stopping the motor 61. There is thus provided a novel servo control system which permits an output function to follow an input function at high frequencies with minimum time lag and which produces fast solution time for step input functions.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use in controlling a variably positioned member; a servo system comprising a first servo motor, a second servo motor, a control device for effecting a variable voltage output signal, a first stage amplifier having an input and an output, a second stage amplifier having an input and an output, first means operatively connecting the variable voltage signal to the input of the first stage amplifier, second means operatively connecting the output of the first stage amplifier to the input of the second stage amplifier, third means operatively connecting the output of the second stage amplifier to the first servo motor, a third stage amplifier having an input and an output, third means operatively connecting the output of the third stage amplifier to the second servo motor, fourth means operatively connecting the output of the first stage amplifier to the input of the third stage amplifier, said fourth connecting means including signal limiting means so arranged as to prevent passage of a signal voltage from said first stage amplifier to said third stage amplifier upon the signal voltage being within a predetermined limited range while permitting passage of the signal voltage from said first stage amplifier to said third stage amplifier upon the signal voltage exceeding said predetermined range so as to effectively energize the second servo motor, a generator driven by said second servo motor, the fourth connecting means including means for applying output voltage from said generator to the input of the third stage amplifier, said output voltage acting in opposing relation to the signal voltage, and having a braking effect on the second servo motor upon the signal limiting means preventing the passage of the signal voltage from the first stage amplifier to the third stage amplifier, shunting means operatively connected across the output of the generator to divert generator output voltage in excess of a predetermined value from the input of said third stage amplifier, means including a differential transmission means to effectively connect said first servo motor and said second servo motor so as to drive said variably positioned member in additive relation, and said last-mentioned connecting means including follow up means to reposition the variable voltage device with change of position of the variably positioned member in a sense to cause said device to reduce the signal voltage to a null upon a cessation of the changes in the signal voltage.

2. The combination defined by claim 1 in which said shunting means includes a resistor, and a diode switch means serially connected with the resistor and across the output of the generator, said resistor and diode switch means being preset so as to divert output voltage in excess of a predetermined range from the input of the third stage amplifier so that upon the generator output voltage being within the predetermined range set by the shunting means and the signal limiting means preventing the passage of the signal voltage, the generator output voltage applied to the input of the third amplifier provides a braking effect on the second servo motor.

References Cited in the file of this patent

UNITED STATES PATENTS

| 2,464,566 | Ferrell | Mar. 15, 1949 |
| 2,560,337 | Fouassin | July 10, 1951 |
| 2,648,041 | Perkins | Aug. 4, 1953 |

FOREIGN PATENTS

| 879,771 | France | Nov. 30, 1942 |

UNITED STATES PATENT OFFICE

CERTIFICATE OF CORRECTION

Patent No. 2,945,995            July 19, 1960

Norman Wail

It is hereby certified that error appears in the printed specification of the above numbered patent requiring correction and that the said Letters Patent should read as corrected below.

Column 4, line 9, for "decreases and the output voltage" read -- in excess of a predetermined value --.

Signed and sealed this 25th day of April 1961.

(SEAL)
Attest:

ERNEST W. SWIDER
Attesting Officer

DAVID L. LADD
Commissioner of Patents